US009352653B2

(12) United States Patent
Kawasaki et al.

(10) Patent No.: US 9,352,653 B2
(45) Date of Patent: May 31, 2016

(54) CIRCUIT BREAKING UNIT AND RAILCAR INCLUDING THE SAME

(75) Inventors: Hiroyuki Kawasaki, Takasago (JP); Hiroyuki Sakurai, Akashi (JP); Ryoji Negi, Kobe (JP); Shin Imanishi, Tokyo (JP); Nobuyuki Sema, Tokyo (JP); Kenji Sekiguchi, Kawasaki (JP)

(73) Assignees: KAWASAKI JUKOGYO KABUSHIKI KAISHA, Kobe (JP); SWCC SHOWA CABLE SYSTEMS CO., LTD., Tokyo (JP)

( * ) Notice: Subject to any disclaimer, the term of this patent is extended or adjusted under 35 U.S.C. 154(b) by 263 days.

(21) Appl. No.: 13/979,780

(22) PCT Filed: Jan. 14, 2011

(86) PCT No.: PCT/JP2011/000179
§ 371 (c)(1),
(2), (4) Date: Sep. 24, 2013

(87) PCT Pub. No.: WO2012/095895
PCT Pub. Date: Jul. 19, 2012

(65) Prior Publication Data
US 2014/0020999 A1    Jan. 23, 2014

(51) Int. Cl.
| | |
|---|---|
| *B60L 5/00* | (2006.01) |
| *B60L 9/00* | (2006.01) |
| *B61G 5/10* | (2006.01) |
| *B60L 3/04* | (2006.01) |
| *B60L 5/26* | (2006.01) |

(52) U.S. Cl.
CPC ... *B60L 5/00* (2013.01); *B60L 3/04* (2013.01); *B60L 9/00* (2013.01); *B61G 5/10* (2013.01); *B60L 5/26* (2013.01); *B60L 2200/26* (2013.01); *B60L 2220/46* (2013.01); *B60L 2240/12* (2013.01); *B60L 2260/28* (2013.01)

(58) Field of Classification Search
CPC ............... B60L 9/00; B60L 5/00; B60L 5/18; B60L 2200/26; B60L 11/1801; B60L 3/04; B60L 3/00; B60L 3/06; B61G 5/10
USPC .................. 191/45 R, 50, 55, 8; 361/23, 102; 307/9.1, 100, 31
See application file for complete search history.

(56) References Cited

U.S. PATENT DOCUMENTS

2010/0006385 A1* 1/2010 Aubigny et al. .................. 191/2

FOREIGN PATENT DOCUMENTS

| | | |
|---|---|---|
| CN | 100544994 C | 9/2009 |
| JP | A-9-308075 | 11/1997 |

(Continued)

OTHER PUBLICATIONS

Feb. 28, 2015 Chinese Office Action issued in Application No. 201180064504.4.

*Primary Examiner* — Mark Le
(74) *Attorney, Agent, or Firm* — Oliff PLC

(57) ABSTRACT

A railcar includes: a power collector configured to collect electric power through overhead contact lines; a circuit breaking unit connected to the power collector and arranged on a roof of a car; and a plurality of electric power cables connected to the circuit breaking unit. The circuit breaking unit includes: a circuit breaker arranged above the roof and connected to a circuit connected to the power collector; and a branch joint which is integrally connected to a terminal portion of the circuit breaker and arranged under the circuit breaker and to which the plurality of electric power cables are connected.

12 Claims, 9 Drawing Sheets

(56) References Cited

FOREIGN PATENT DOCUMENTS

| JP | 2000-125409 | * | 4/2000 |
|---|---|---|---|
| JP | 2001-8351 | * | 1/2001 |
| JP | A-2001-177975 | | 6/2001 |
| JP | A-2004-96929 | | 3/2004 |
| JP | B2-3617301 | | 2/2005 |
| JP | A-2009-136142 | | 6/2009 |

* cited by examiner

RAILCAR LONGITUDINAL DIRECTION

RAILCAR LONGITUDINAL DIRECTION

CIRCUIT BREAKING UNIT AND RAILCAR INCLUDING THE SAME

TECHNICAL FIELD

The present invention relates to a circuit breaking unit and a railcar including the circuit breaking unit.

BACKGROUND ART

In conventional railcars, various layouts of pantographs for collecting electric power through overhead contact lines and respective high voltage devices, such as vacuum circuit breakers (VCB) and arresters (lightning arresters), have been proposed. For example, in a railcar disclosed in PTL 1, the pantograph is arranged on a roof of a car, and some high voltage devices, such as the vacuum circuit breaker and the arrester, are mounted under a floor of the car together with a main transformer, a main converter, a main electric motor, and the like. In the railcar of PTL 1, the electric power collected by the pantograph is supplied to the respective high voltage devices through electric power cables extending from on the roof to under the floor. Especially, such a layout is often adopted in railcars that travel at comparatively high speed (hereinafter may be simply referred to as "high speed railcars"). In the case of some express trains in countries other than Japan, the vacuum circuit breaker, the arrester, outdoor terminations, and the like are mounted on the roof.

In the high speed railcar in which a plurality of cars are coupled to one another, the pantograph arranged on the roof tends to become a noise source when the railcar travels at high speed. Therefore, the number of pantographs is set to be smaller than the number of cars coupled to one another. On this account, a branch joint for branching and connecting of a plurality of electric power cables is arranged on the roof of the car, and a part of the electric power cables connected to the branch joint are arranged to extend toward the other cars. Thus, the electric power collected by the pantograph is distributed to the other cars.

CITATION LIST

Patent Literature

PTL 1: Japanese Laid-Open Patent Application Publication No. 2009-136142

SUMMARY OF INVENTION

Technical Problem

In the railcar of PTL 1, a large number of devices, such as the main transformer, the main converter, the electric motor, and the other devices, such as a bogie, are mounted under the floor of the car, and the high voltage devices are large in size because of insulation separation. Therefore, there is little space under the floor of the car, so that the degree of freedom of the layout of the devices is low. When maintaining the respective high voltage devices, an operator needs to crawl under the floor of the car. Therefore, the maintenance work efficiency is not good. Further, since the pantograph and the high voltage devices are respectively, separately arranged on the roof and under the floor, the electric power cables for connecting the pantograph and the high voltage devices increase in length. High voltages supplied through the overhead contact lines are applied to the electric power cables. Therefore, from the viewpoint of safety and circuit protection, it is preferable that the high voltage devices be arranged on as electrically upstream a side as possible.

In contrast, in a case where the high voltage devices conventionally arranged under the floor are moved to the roof of the car, the problem is that the degree of freedom of the arrangement layout of the respective devices is low. To be specific, high voltage electric power cables arranged on the roof are thick, and it is not easy to bend the cables when arranging them. Therefore, if the number of devices arranged on the roof increases, the degree of freedom of the layout for connecting the devices with each other by the thick electric power cables is restricted.

Here, an object of the present invention is to improve the degree of freedom of the layout of respective high voltage devices while arranging the high voltage devices on a roof of a car.

Solution to Problem

A railcar according to the present invention includes: a power collector configured to collect electric power through overhead contact lines; a circuit breaking unit connected to the power collector and arranged on a roof of a car; and a plurality of electric power cables connected to the circuit breaking unit, wherein the circuit breaking unit includes: a circuit breaker arranged above the roof and connected to a circuit connected to the power collector; and a branch joint which is integrally connected to a terminal portion of the circuit breaker and arranged under the circuit breaker and to which the plurality of electric power cables are connected.

According to the above configuration, the branch joint is arranged under the circuit breaker, and the circuit breaker and the branch joint are integrally formed. Therefore, the circuit breaker and the branch joint are sterically, compactly unitized. Thus, the area occupied by the devices can be reduced. On this account, the degree of freedom of the layout of the respective devices can be improved while arranging the circuit breaker on the roof of the car.

Advantageous Effects of Invention

As is clear from the above explanation, according to the present invention, the degree of freedom of the layout of the respective devices can be improved while arranging the circuit breaker on the roof of the car.

DESCRIPTION OF EMBODIMENTS

Hereinafter, embodiments according to the present invention will be explained in reference to the drawings.

Embodiment 1

Figure 1:
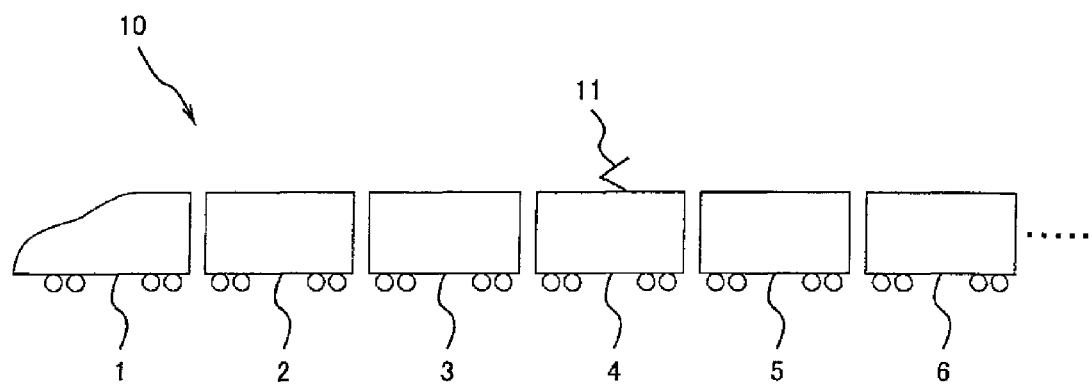
FIG. 1 is a side view schematically showing a railcar according to Embodiment 1 of the present invention.

FIG. 1 is a side view schematically showing a railcar 10 according to Embodiment 1 of the present invention. As shown in FIG. 1, the railcar 10 is a plural-car train in which a plurality of cars 1 to 8 (cars 7 and 8 are not shown) are coupled to one another. Each of the cars 2 to 7 except for both first cars (cars 1 and 8) is provided with main electric motors 22 (see FIG. 2) for traveling. In addition, a pantograph is arranged on a roof of the fourth car 4. The present embodiment explains this eight-car train as one example. However, the number of cars and the arrangement of the respective devices such as the main electric motors and the pantograph are not limited to these.

Figure 2:
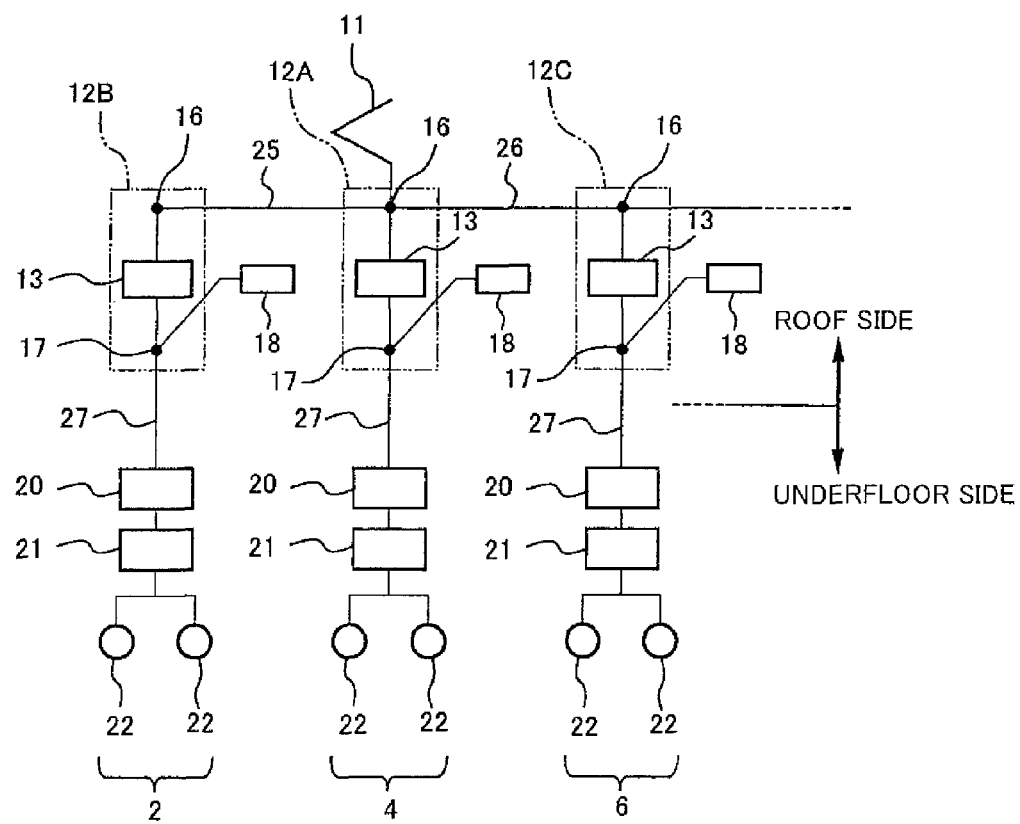
FIG. 2 is a pattern diagram showing an electric system of the railcar shown in FIG. 1.

FIG. 2 is a pattern diagram showing an electric system of the railcar 10 shown in FIG. 1. As shown in FIG. 2, a power collector 11 configured to collect electric power through overhead contact lines and a circuit breaking unit 12A connected to the power collector 11 are arranged on the roof of the fourth car 4. The circuit breaking unit 12A includes: a circuit breaker 13 (high voltage breaker) constituted by a vacuum circuit breaker (VCB) connected to the power collector 11; a branch joint 16 connected to an input side of the circuit breaker 13; and a branch joint 17 connected to an output side of the circuit breaker 13. Thus, the circuit breaking unit 12A is configured as a circuit breaking unit with a branching function. The circuit breaker 13 is connected to a circuit between the power collector 11 and a below-described main transformer 20. The circuit breaker 13 breaks the circuit when a predetermined current or a current higher than the predetermined current flows through the circuit breaker 13. To distribute the electric power to the second car 2 through the third car 3, a first electric power cable 25 is connected to the branch joint 16 located on the input side. To distribute the electric power to the sixth car 6 through the fifth car 5, a second electric power cable 26 is connected to the branch joint 16 located on the input side. The first electric power cable 25 is connected to a circuit breaking unit 12B arranged on a roof of the second car 2, and the second electric power cable 26 is connected to a circuit breaking unit 12C arranged on a roof of the sixth car 6.

An arrester 18 (lightning arrester) and a third electric power cable 27 are connected to the branch joint 17 located on the output side. The third electric power cable 27 is provided to extend from on the roof of each of the cars 2, 4, and 6 toward under the floor. The arrester 18 is provided to prevent dielectric breakdown of electric parts. Only when an abnormal current is generated by lightening strike or the like, the arrester 18 connects the circuit to ground to discharge electric power. In the present embodiment, the arrester 18 is a plug-in type. The main transformers 20 are respectively arranged under the floors of the second, fourth, and sixth cars 2, 4, and 6. The main transformers 20 are respectively connected to the branch joints 17 of the circuit breaking units 12A to 12C through the third electric power cables 27. Each of the cars except for both first cars 1 and 8 includes a main converter 21 and the main electric motors 22 connected to the main converter 21 and configured to drive wheels. The main transformer 20 may be arranged inside the car, not under the floor.

Figure 3:
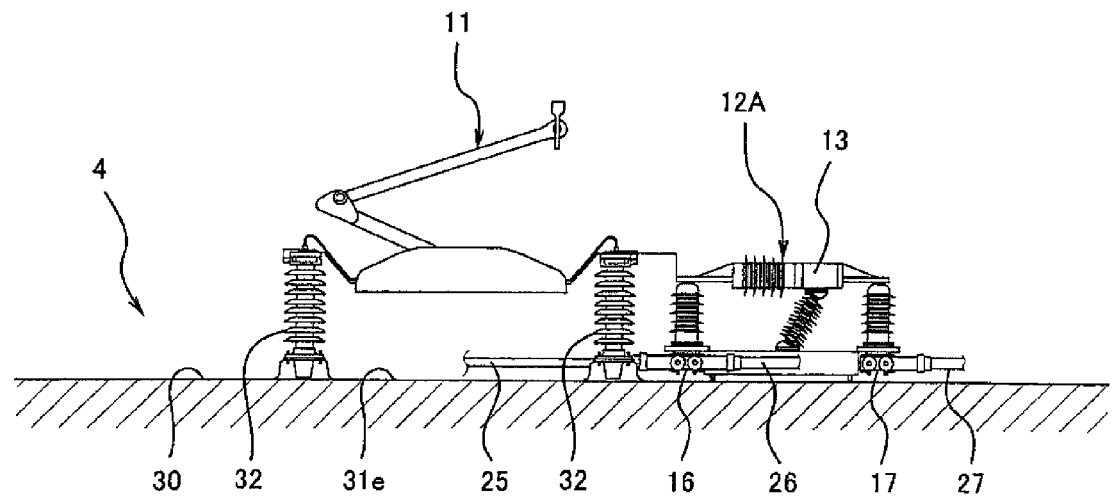
FIG. 3 is a vertical cross-sectional view showing a roof of a fourth car of the railcar shown in FIG. 1 and devices arranged on the roof.
Figure 4:
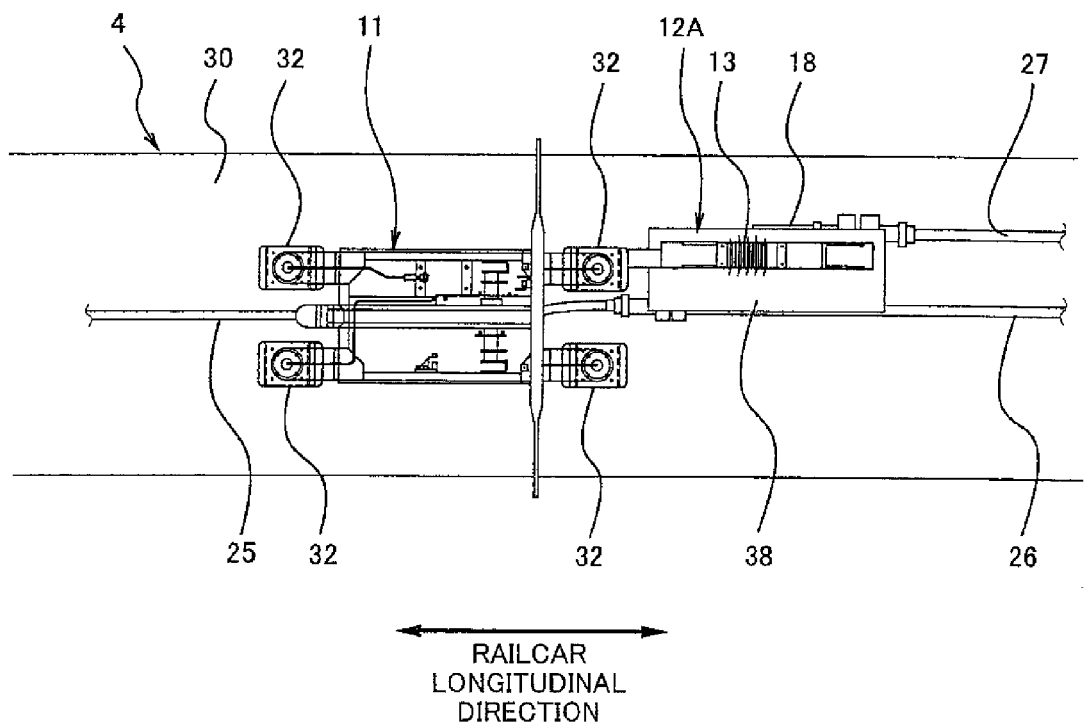
FIG. 4 is a plan view showing the roof of the fourth car of the railcar shown in FIG. 1 and the devices arranged on the roof.

FIG. 3 is a vertical cross-sectional view showing a roof 30 of the fourth car 4 of the railcar 10 shown in FIG. 1 and devices arranged on the roof 30. FIG. 4 is a plan view showing the roof 30 of the fourth car 4 of the railcar 10 shown in FIG. 1 and the devices arranged on the roof 30. As shown in FIGS. 3 and 4, the power collector 11 and the circuit breaking unit 12A are arranged on an upper surface of the roof 30 of the car 4. The power collector 11 is supported by four support insulators 32 arranged on the upper surface of the roof 30. A wind shield (not shown) is arranged on the roof 30 to prevent wind from directly hitting the support insulators 32 and the circuit breaking unit 12A while the railcar 10 is traveling.

The circuit breaking unit 12A and the power collector 11 are adjacently arranged in a railcar longitudinal direction. The circuit breaking unit 12A is arranged such that a longitudinal direction thereof corresponds to the railcar longitudinal direction (proceeding direction). The first electric power cable 25 connected to the circuit breaking unit 12A extends in the railcar longitudinal direction toward the third car 3 (see FIG. 1) so as to pass between the support insulators 32 under the power collector 11. The second electric power cable 26 connected to the circuit breaking unit 12A extends in the railcar longitudinal direction toward the fifth car 5 (see FIG. 1). The third electric power cable 27 connected to the circuit breaking unit 12A extends in the railcar longitudinal direction toward a car end portion of the fourth car 4. A cable extending from the power collector 11 is connected to an input-side terminal portion 13b of the circuit breaker 13 or a joint connector portion 16e of the below-described branch joint 16.

Figure 5:
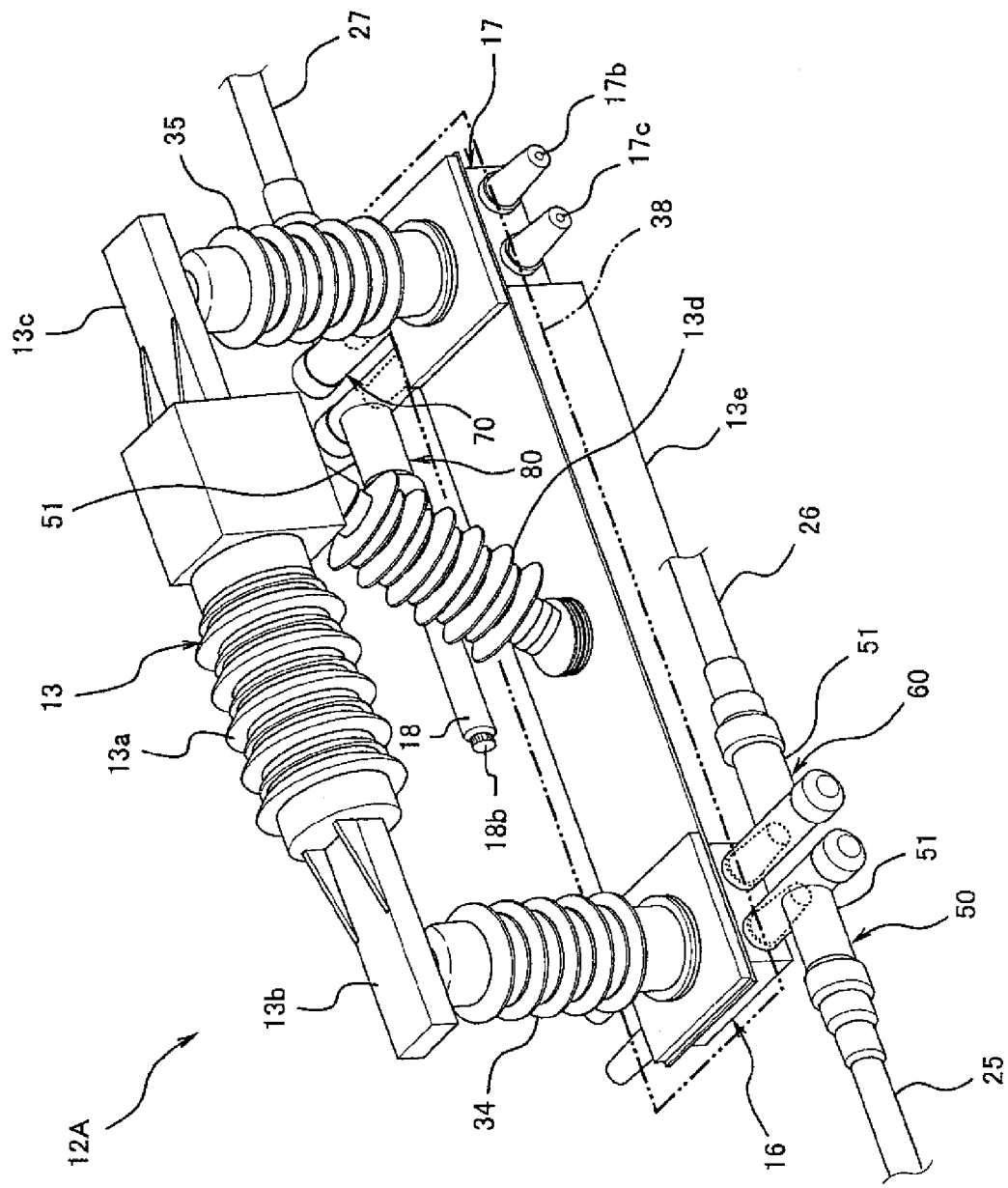
FIG. 5 is an enlarged perspective view showing a circuit breaking unit shown in FIGS. 3 and 4.
Figure 6:
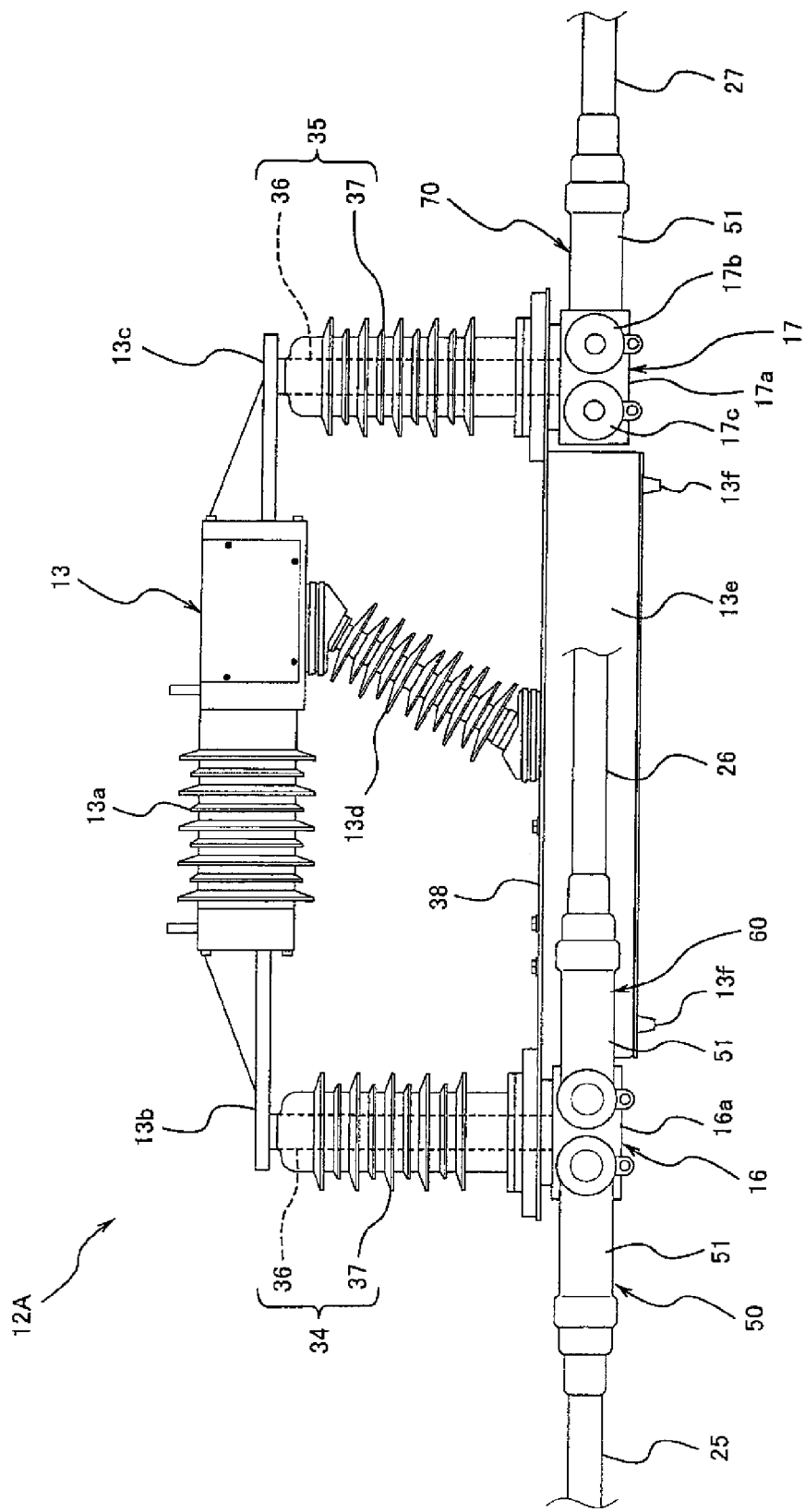
FIG. 6 is a side view of the circuit breaking unit shown in FIG. 5.
Figure 7:
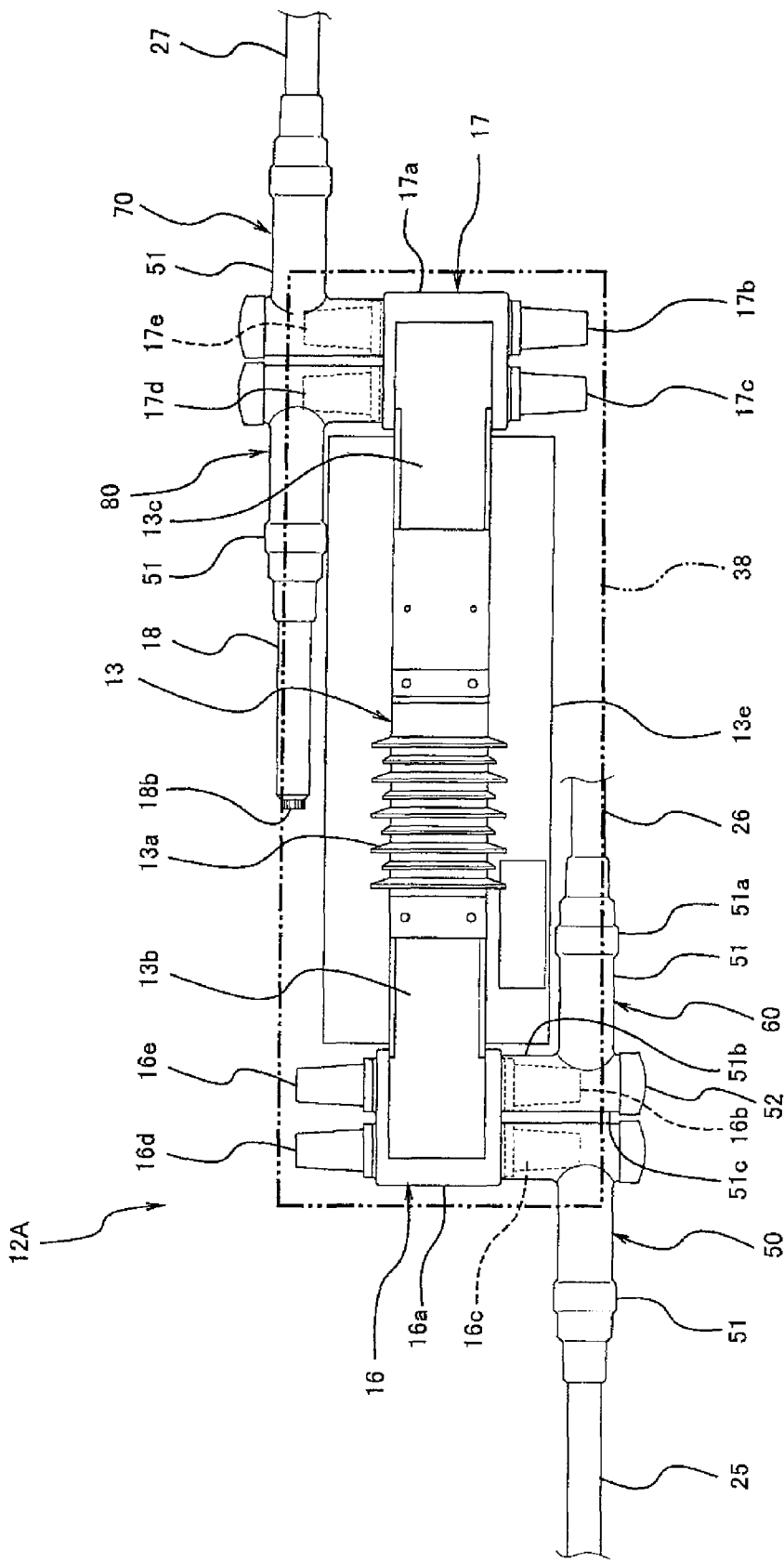
FIG. 7 is a plan view showing the circuit breaking unit shown in FIG. 6.

FIG. 5 is an enlarged perspective view showing the circuit breaking unit 12A shown in FIGS. 3 and 4. FIG. 6 is a side view of the circuit breaking unit 12A shown in FIG. 5. FIG. 7 is a plan view of the circuit breaking unit 12A shown in FIG. 6. As shown in FIGS. 5 to 7, the circuit breaking unit 12A integrally includes the circuit breaker 13, supporting bodies 34 and 35, and the branch joints 16 and 17. The supporting body 34 and the branch joint 16 (or the supporting body 35 and the branch joint 17) are integrally formed as described below, and the circuit breaker 13 and each of the supporting bodies 34 and 35 are detachably connected to each other. The circuit breaker 13 includes: a main body portion 13a configured to open and close the circuit; the input-side terminal portion 13b projecting from the main body portion 13a toward one side (the car 3 side) in a substantially horizontal direction; an output-side terminal portion 13c projecting from the main body portion 13a toward the other side (the car 5 side) in the substantially horizontal direction; an actuator 13d connected to the main body portion 13a from below and configured to activate an open-close function; and a control box 13e connected to a lower end of the actuator 13d and configured to control the actuator 13d. The main body portion 13a and the terminal portions 13b and 13c are arranged above and spaced apart from the upper surface of the roof 30. Leg portions 13f configured to contact the upper surface of the roof 30 project from a lower surface of the control box 13e. A plate 38 that is larger than the control box 13e in plan view is fixed to an upper surface of the control box 13e.

The supporting bodies 34 and 35 are respectively, vertically arranged at the terminal portions 13b and 13c of the circuit breaker 13 so as to respectively support the terminal portions 13b and 13c from below. Each of the supporting bodies 34 and 35 has a structure similar to the structure of an insulator-type cable head. To be specific, the supporting body 34 includes: a supporting conductor 36 extending in an upper direction from the below-described branch joint 16; and an insulator 37 configured to cover the periphery of the supporting conductor 36, and the supporting body 35 includes: a supporting conductor 36 extending in the upper direction from the below-described branch joint 17; and an insulator 37 configured to cover the periphery of the supporting conductor 36. Upper ends of the supporting conductors 36 projecting upward from upper ends of the insulators 37 are respectively connected to the terminal portions 13b and 13c. Although not shown in detail, each of the insulators 37 is formed such that: a hard insulating body made of, for example, epoxy resin is formed on an outer periphery of the supporting conductor 36; an outer periphery of the hard insulating body is covered with a heat shrinkable tube made of, for example, ethylene-vinyl acetate copolymer resin (EVA) and having an insulating property; and a plurality of sheds are included. A lower end side of the insulator 37 is fixed to an upper surface of a portion of the plate 38 with bolts or the like, not shown, via a metal fitting, the portion protruding from the control box 13e in the longitudinal direction in plan view. The supporting body 34 and the below-described branch joint 16 are formed integrally, and the supporting body 35 and the below-described branch joint 17 are formed integrally. Since each of vertical sizes of the branch joints 16 and 17 is smaller than that of the control box 13e, the branch joints 16 and 17 are spaced apart from the upper surface of the roof 30. Then, the terminal portion 13b, the supporting body 34, and the branch joint 16 are respectively arranged at positions overlapping with one another in plan view, and the terminal portion 13c, the supporting body 35, and the branch joint 17 are respectively arranged at positions overlapping with one another in plan view.

Figure 8:
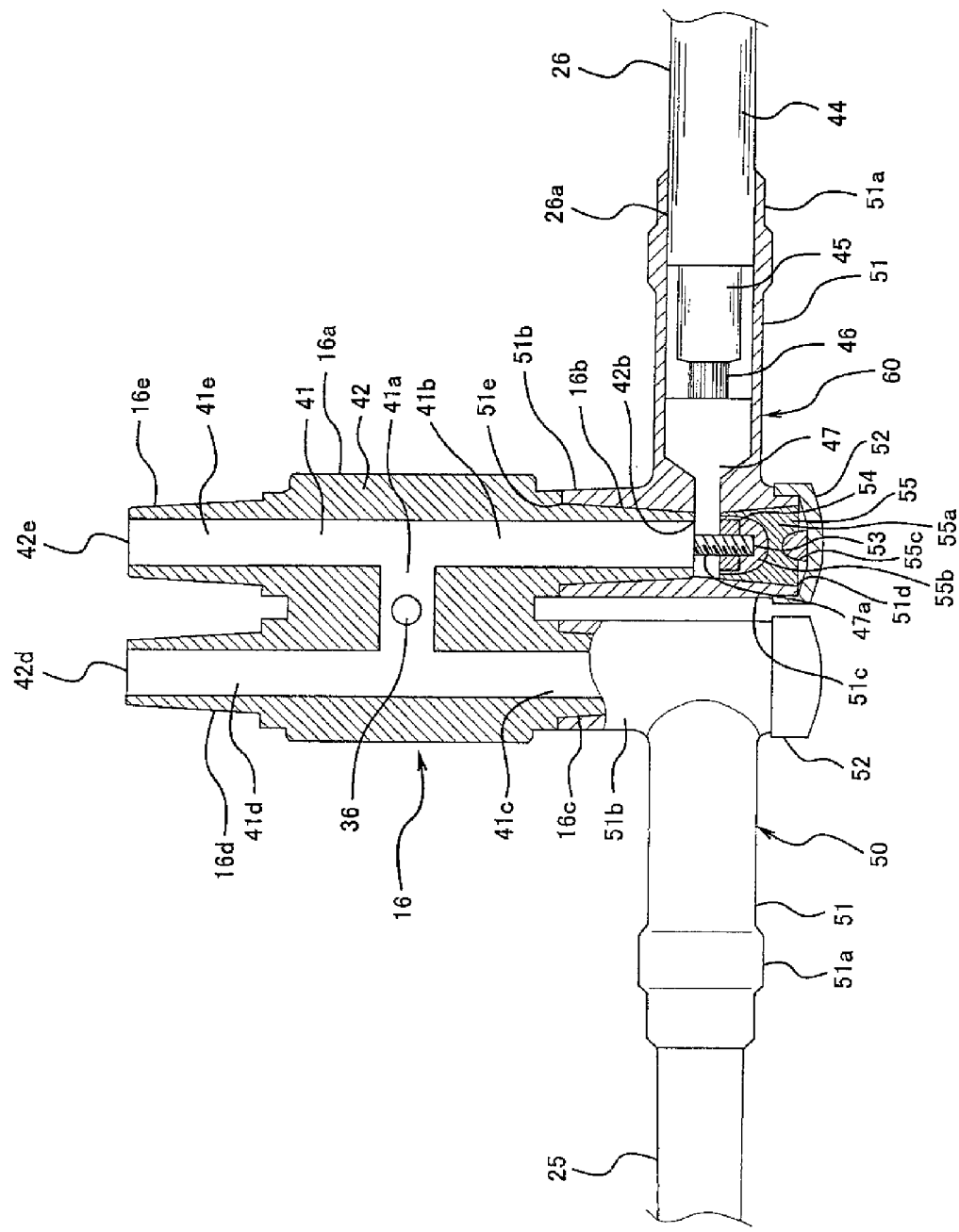
FIG. 8 is an enlarged horizontal cross-sectional view showing an input-side branch joint shown in FIG. 7 and its surroundings.
Figure 9:
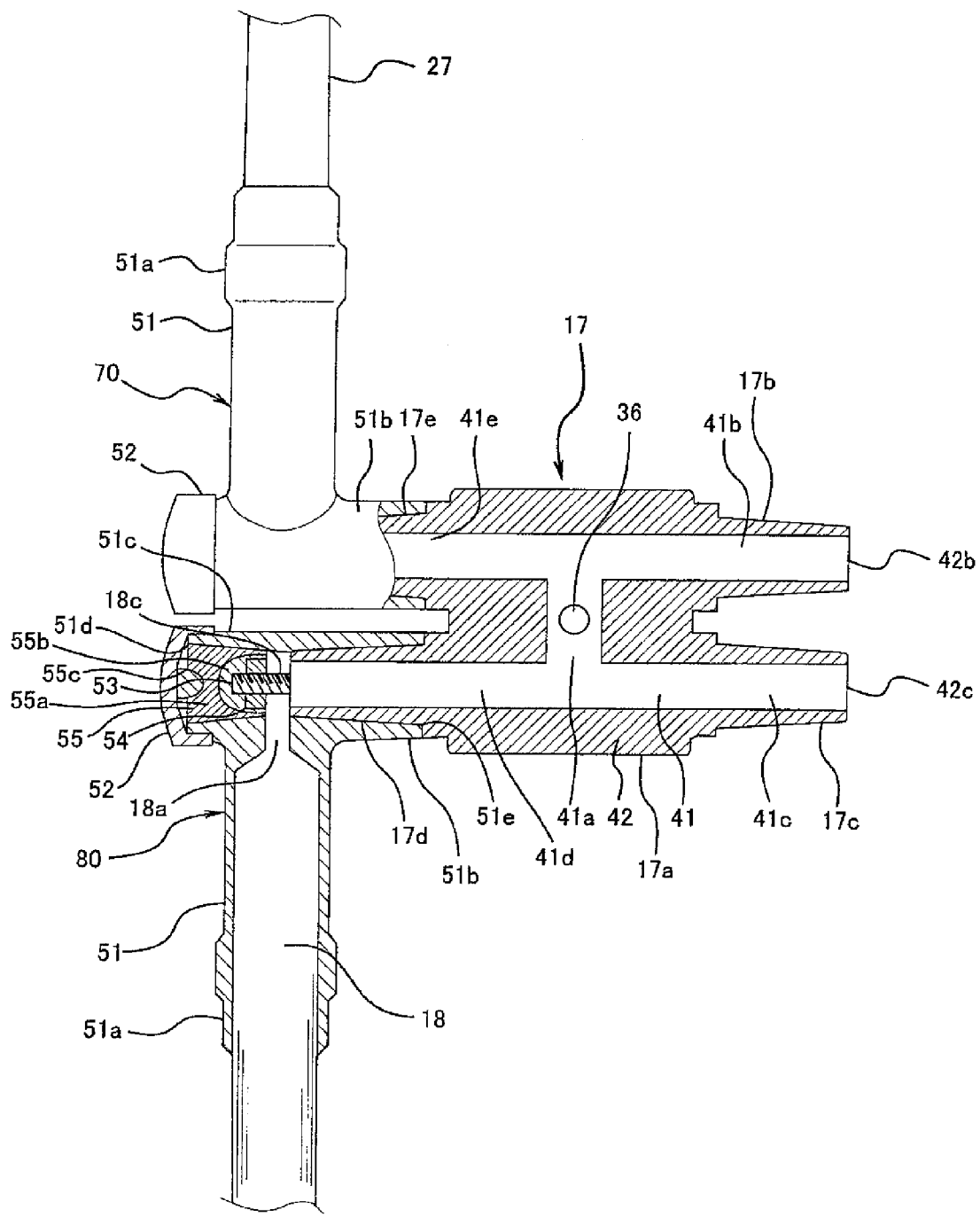
FIG. 9 is an enlarged horizontal cross-sectional view showing an output-side branch joint shown in FIG. 7 and its surroundings.

FIG. 8 is an enlarged horizontal cross-sectional view showing the input-side branch joint 16 shown in FIG. 7 and its surroundings. FIG. 9 is an enlarged horizontal cross-sectional view showing the output-side branch joint 17 shown in FIG. 7 and its surroundings. Since the branch joints 16 and 17 are the same in structure as each other, the following will mainly explain the branch joint 16. As shown in FIG. 8, the branch joint 16 includes: a conductor 41 integrally formed at a lower end of the supporting conductor 36; and an insulating body 42 configured to cover the conductor 41. The conductor 41 includes: a base portion 41a at which the lower end portion of the supporting conductor 36 is consecutively installed; two branch portions 41b and 41c projecting from the base portion 41a toward one side in a railcar width direction in parallel with each other; and two branch portions 41d and 41e projecting from the base portion 41a toward the other side in the railcar width direction in parallel with each other. The conductor 41 has a substantially H shape in plan view.

Then, the insulating body 42 is made of a hard insulating material, such as epoxy resin, and is formed integrally with the supporting body 34. To be specific, a conducting portion configured by integrally forming the supporting conductor 36 and the conductor 41 and an insulating portion configured by integrally forming the insulating body inside the sheds of the insulator 37 and the insulating body 42 of the branch joint 16 are integrally formed by molding. The branch joint 16 has a substantially H shape in plan view as a whole and covers the conductor 41. That is, in terms of the shape, the branch joint 16 includes: a base portion 16a consecutively installed at the lower end portion of the supporting body 34; two joint connector portions 16b and 16c projecting from the base portion 16a toward one side in the railcar width direction; and two joint connector portions 16d and 16e projecting from the base portion 16a toward the other side in the railcar width direction.

Each of the joint connector portions 16b to 16e is formed in a substantially conical shape, that is, decreases in diameter as it extends toward its tip end. The conductor 41 is embedded in the insulating body 42 at the joint connector portions 16b to 16e, and tip ends of the branch portions 41b to 41e of the conductor 41 are respectively exposed from tip ends 42b to 42e of the insulating body 42. Bolt holes (not shown) each having a predetermined depth are formed on tip end surfaces of the branch portions 41b to 41e respectively exposed from the tip ends 42b to 42e of the insulating body 42 at the joint connector portions 16b to 16e.

As shown in FIGS. 8 and 9, cable connectors 50, 60, and 70 are respectively attached to tip end portions of the first to third electric power cables 25 to 27, and an arrester connector 80 is attached to a tip end portion of the plug-in type arrester 18. The connectors 50, 60, 70, and 80 respectively include T-shaped housings 51 made of an elastic insulating material, such as ethylene propylene rubber (EP rubber) or silicone rubber, and these housings 51 are the same in shape as one another. Although not shown, an inner semi-conducting layer is formed on an inner peripheral side of a central portion of each housing 51 such that the inner semi-conducting layer covers the vicinity of a connecting terminal 47 and an inner peripheral side of the inner semi-conducting layer is exposed, and an outer semi-conducting layer is formed on an outer periphery of each housing 51. The inner semi-conducting layer and the outer semi-conducting layer are formed integrally with the housing 51, and the configurations of these layers are known to those skilled in the art (see Japanese Laid-Open Patent Application Publication No. 9-308075 and Japanese Laid-Open Patent Application Publication No. 2004-96929, for example). The inner semi-conducting layer is made of semi-conducting ethylene propylene rubber (EP rubber) or semi-conducting silicone rubber, and the outer semi-conducting layer is made of semi-conducting or conducting paint, semi-conducting ethylene propylene rubber (EP rubber), or semi-conducting silicone rubber.

Each of the housings 51 includes a base tubular portion 51a, a fit tubular portion 51b, and a work tubular portion 51c. The tip end portion of each of the electric power cables 25, 26, and 27 and plug-in type arrester 18 is inserted into the base tubular portion 51a. The fit tubular portion 51b extends continuously from the base tubular portion 51a in a direction substantially perpendicular to the base tubular portion 51a, and a fit opening 51e is formed at a tip end of the fit tubular portion 51b. The work tubular portion 51c extends in a direction substantially perpendicular to the base tubular portion 51a, is located on the substantially same straight line as the fit tubular portion 51b, and projects in a direction opposite to the direction in which the fit tubular portion 51b extends. Internal spaces of the respective tubular portions 51a to 51c communicate with each other to form a T shape as a whole. The fit opening 51e is formed at the housing 51 such that a fit direction corresponds to a direction substantially perpendicular to a length direction of each of the electric power cables 25 to 27. Herein, an inner peripheral surface of the fit tubular portion 51b is formed in a substantially conical shape so as to correspond to each of outer shapes of the branch portions 41b to 41e of the branch joint 16. A work opening 51d that opens on the opposite side of the fit opening 51e is formed on the work tubular portion 51c. A below-described insulating plug 55 and cap 52 are detachably attached to the work opening 51d.

At the tip end portion of the electric power cable 26, a cable insulator 45 is exposed by removing a covering 44, and a cable conductor 46 is exposed from a tip end of the cable insulator 45. A connecting terminal 47 including a connecting hole 47a in the vicinity of a tip end portion thereof is joined to the cable conductor 46 by compression. The connecting terminal 47 is located inside the housing 51 and includes a compressed portion compressed with respect to the cable conductor 47. The compressed portion is formed in an annular shape, and a tip end portion of the connecting terminal 47 is formed in a plate shape. The electric power cable 26 with the connecting terminal 47 is inserted into the base tubular portion 51a of the housing 51, and the tip end portion of the connecting terminal 47 is exposed in the internal space of the fit tubular portion 51b of the housing 51. The housing 51 is fixed to the electric power cable 26 with the connecting terminal 47 such that the center of the connecting hole 47a of the connecting terminal 47 substantially coincides with the center of the internal space of the fit tubular portion 51b. With this, the cable connector 60 is formed. The insulating plug 55 includes an insulating plug main body 55a, a fixing embedded metal fitting 55b, and a work embedded metal fitting 55c. The insulating plug main body 55a is made of a hard insulating body, such as epoxy resin. The fixing embedded metal fitting 55b is embedded in the insulating plug main body 55a such that a tip end surface thereof is exposed at a tip end side of the insulating plug main body 55a. The work embedded metal fitting 55c which is made of metal is embedded in the insulating plug main body 55a such that a rear end portion thereof is exposed at a rear end side (a side where the cap 52 is attached) of the insulating plug main body 55a. A groove for accommodating a nut 54 and an internal thread for fixing a bolt 53 are formed at a tip end portion of the fixing embedded metal fitting 55b. The bolt 53 is screwed to a tip end of the branch portion 41b of the conductor 41 at the joint connector portion 16b and projects from the tip end of the branch portion 41b.

When connecting the cable connector 60 to the joint connector portion 16b, the fit tubular portion 51b is fitted to the joint connector portion 16b. With this, the bolt 53 is inserted through the connecting hole 47a of the connecting terminal 47 exposed in the internal space of the housing 51. Then, the nut 54 is fastened via the work opening 51d to a portion of the bolt 53, the portion projecting from the connecting hole 47a. With this, the connecting terminal 47 and the conductor 41 are connected to each other. When detaching the connector 60 from the joint connector portion 16b, a procedure opposite to the above connecting work may be just performed. The unused joint connector portion (such as the joint connector portion 16d, 16e, 17b, or 17c in FIG. 7) to which the electric power cable or the plug-in type arrester is not connected may be closed by an insulating cap (not shown) or the like.

As shown in FIG. 9, the plug-in type arrester 18 has a substantially columnar outer shape and includes a high-voltage connecting terminal 18a at one longitudinal end portion thereof and a ground terminal 18b (see FIG. 5) at the other end portion. A connecting hole 18c is formed at the high-voltage connecting terminal 18a. The work of connecting the arrester connector 80 to a joint connector portion 17d is the same as the work of connecting the cable connector 60 to the joint connector portion 16b. In the case of not using the plug-in type arrester 18, an arrester may be separately provided, and the joint connector portion 17d may be closed by an insulating cap (not shown) or the like. Even in the case of not using the plug-in type arrester 18, the effects of the present invention can be obtained. However, in view of the work efficiency of the attachment and the reduction in space for the respective high voltage devices in the railcar, it is more preferable to use the plug-in type arrester 18.

According to the configuration explained above, even in a case where the high voltage device conventionally arranged under the floor are arranged on the roof, the respective high voltage devices do not have to be connected to one another via high-voltage cables. Therefore, the work efficiency at the time of the production of the cars and the maintenance can be improved, and the degree of freedom of the layout of the respective devices can be improved. Especially, the branch joints 16 and 17 are arranged under the circuit breaker 13, and the circuit breaker 13 and the branch joints 16 and 17 are integrally formed. Therefore, the circuit breaker 13 and the branch joints 16 and 17 are sterically, compactly unitized. Thus, the area occupied by the devices in plan view can be reduced.

Each of the cable connectors 50, 60, and 70 is configured such that the fit direction thereof corresponds to a direction substantially perpendicular to a length direction of the first, second, or third electric power cable 25, 26, or 27. Therefore, even in the case of using the high-voltage electric power cables 25 to 27 that are thick and difficult to bend, extra lengths are not so required, so that the further reduction in space can be realized. Specifically, unlike a so-called prefabricated joint (see Japanese Laid-Open Patent Application Publication No. 2001-177975, for example) in which a spindle-shaped stress-relief cone made of rubber is pressed against a receiving port of an epoxy resin bushing by a compression unit, a space corresponding to a bending radius of the electric power cable and a space for significant pull-back of the electric power cable at the time of the assembly become unnecessary. Therefore, the reduction in space can be realized. In addition, since the respective housings 51 of the respective connectors 50, 60, 70, and 80 are the same in shape as one another, the commonality of those parts can be realized. Further, the connectors 50, 60, 70, and 80 are respectively connected to the joint connector portions 16c, 16b, 17e, and 17d by fastening the bolts 53 to the nuts 54 via the work openings 51d. Therefore, attaching and detaching works can be easily performed.

In the above-described embodiment, the branch joint 16 includes the four joint connector portions 16b to 16e, and each of projecting directions of the joint connector portions 16b to 16e corresponds to the railcar width direction. Similarly, the branch joint 17 includes the four joint connector portions 17b to 17e, and each of projecting directions of the joint connector portions 17b to 17e corresponds to the railcar width direction. However, the above embodiment is not limited to this. The number of joint connector portions, the projecting directions, and the like may be suitably changed depending on the specifications of the railcar. For example, the projecting direction of the joint connector portion may correspond to the railcar longitudinal direction. In a case where the plug-in type arrester 18 is connected to the output-side branch joint 17 as in the present embodiment or in a case where the arrester is not the plug-in type and is separately provided downstream of the circuit breaker 13, the branch joint connected to the input-side terminal portion 13b may include two joint connector portions to which the first electric power cable 25 and the second electric power cable are respectively connected. In a case where an arrester that is not the plug-in type arrester 18 of the present embodiment is attached to the railcar, the joint connector portion 17d shown in FIG. 7 is not used. Therefore, if the electric power cable connected to the output-side terminal portion 13c is only the third electric power cable 27, the branch joint does not have to be connected to the output-side terminal portion 13c, and one joint connector portion is enough. In the present embodiment, the cable connectors 50, 60, and 70 and the arrester connector 80 are female connectors, and the joint connector portions 16b to 16e and 17b to 17e are male connectors. However, these female and male connectors may be reversed. The present embodiment has explained the T-shaped housing 51 as each of the cable connectors 50, 60, and 70 and the arrester connector 80. However, an L-shaped housing that does not include the work opening 51d, that is, does not require the insulating plug 55 may be used.

Embodiment 2

Figure 10:
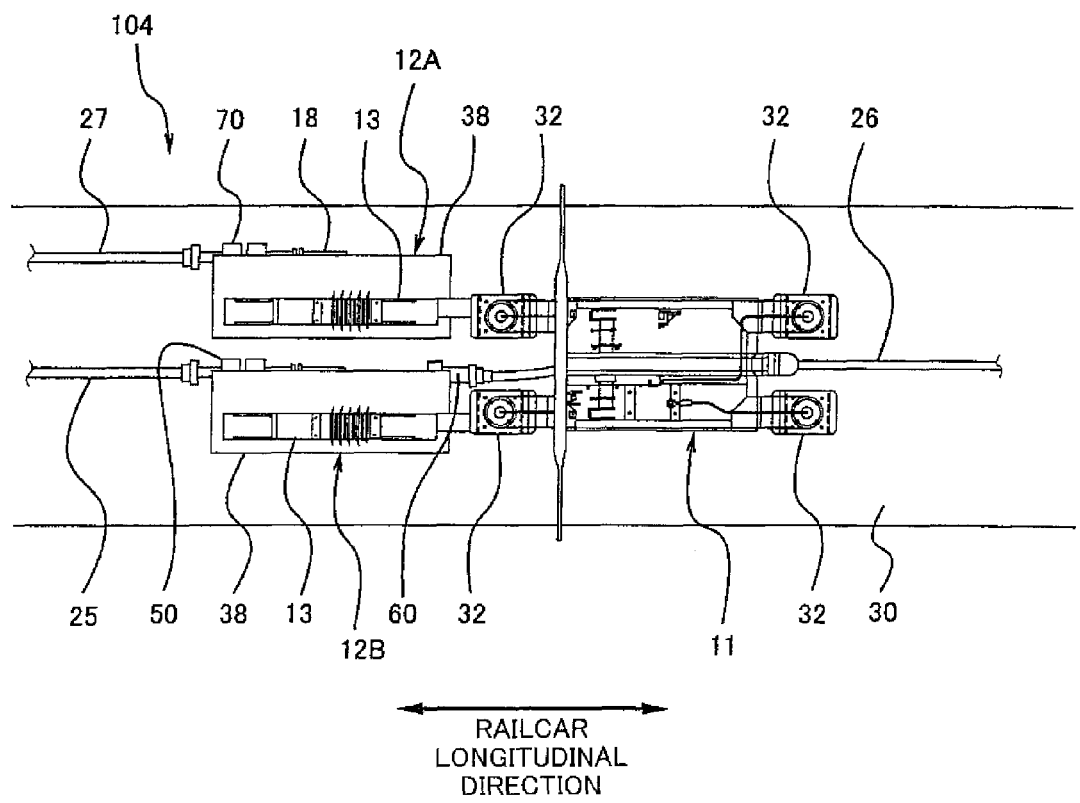
FIG. 10 is a plan view showing the roof of the fourth car of the railcar according to Embodiment 2 of the present invention and the devices arranged on the roof.

FIG. 10 is a plan view showing the roof 30 of the fourth car 104 of the railcar according to Embodiment 2 of the present invention and the devices arranged on the roof 30. As shown in FIG. 10, the power collector 11 and a plurality of circuit breaking units 12A and 12B are arranged on the roof 30 of the fourth car 104. The circuit breaking unit 12A is connected to the main transformer 20 (see FIG. 2) of the fourth car 104, and the circuit breaking unit 12B is connected to the main transformer 20 of the second car that does not include the power collector. The two circuit breaking units 12A and 12B are lined up in the railcar width direction such that each of the longitudinal directions thereof corresponds to the railcar longitudinal direction. The power collector 11 is connected to the input sides of the respective circuit breakers 13 of the circuit breaking units 12A and 12B. The third electric power cable 27 through which the electric power is supplied to the main transformer 20 of the fourth car 104 is connected to the circuit breaking unit 12A via the cable connector 70. The first electric power cable 25 through which the electric power is supplied to the main transformer 20 of the second car is connected to the circuit breaking unit 12B via the cable connector 50 in a downstream side of the circuit breaker 13. In addition, the second electric power cable 26 through which the electric power is supplied to the main transformer 20 of the sixth car is connected to the circuit breaking unit 12B via the cable connector 60 in an upstream side of the circuit breaker 13.

With this configuration, it becomes unnecessary to arrange the circuit breaking unit 12B on the roof of the second car. Therefore, the wind shield for preventing traveling wind from directly hitting the circuit breaking unit 12B does not have to be arranged on the roof of the second car, and this is advantageous for the high-speed travel. The other configurations are the same as those of Embodiment 1, so that explanations thereof are omitted.

Embodiment 3

Figure 11:
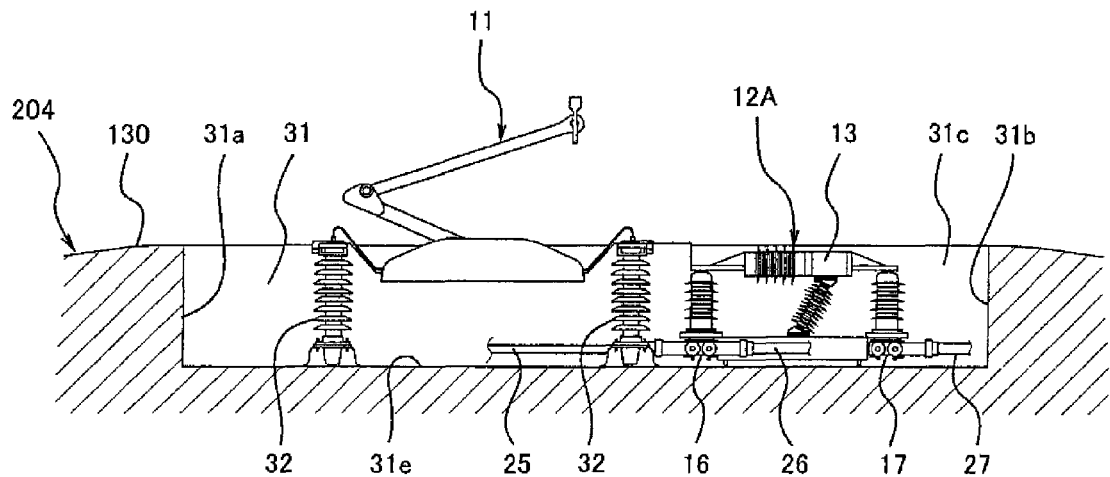
FIG. 11 is a vertical cross-sectional view showing the roof of the fourth car of the railcar according to Embodiment 3 of the present invention and the devices arranged on the roof.
Figure 12:
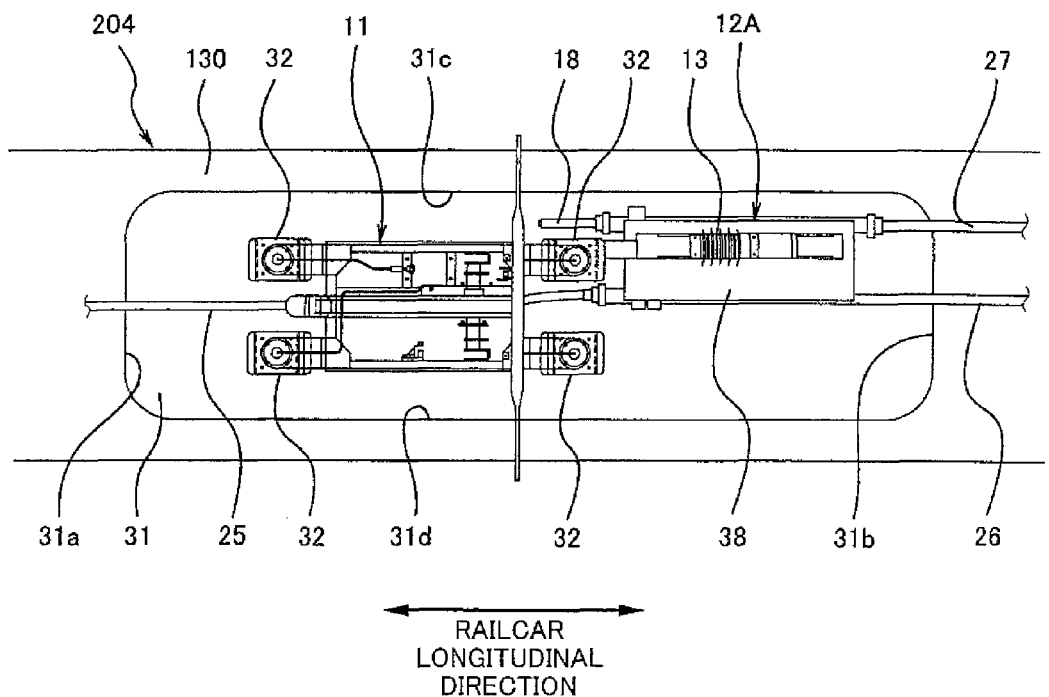
FIG. 12 is a plan view of the railcar shown in FIG. 11.

FIG. 11 is a vertical cross-sectional view showing a roof 130 of a fourth car 204 of the railcar according to Embodiment 3 of the present invention and devices arranged on the roof 130. FIG. 12 is a plan view of the railcar shown in FIG. 11. As shown in FIGS. 11 and 12, a recess 31 whose upper side is open is formed on an upper surface of the roof 130 of the car 204. The recess 31 includes a bottom wall portion 31e having a rectangular shape that is long in the railcar longitudinal direction and vertical wall portions 31a to 31d respectively extending upward from four sides of the bottom wall portion 31e. The power collector 11 and the circuit breaking unit 12A are arranged in the recess 31. The power collector 11 is supported by four support insulators 32 arranged on the bottom wall portion 31e of the recess 31. Each of the height of the support insulator 32 and the height of the circuit breaking unit 12A is set to be equal to or lower than the height of each of the vertical wall portions 31a to 31d of the recess 31. To be specific, the vertical wall portions 31a to 31d of the recess 31 serve as the wind shields for preventing the wind from directly hitting the support insulators 32 of the power collector 11 and the circuit breaking unit 12A while traveling. The other configurations are the same as those of Embodiment 1, so that explanations thereof are omitted.

INDUSTRIAL APPLICABILITY

As above, the railcar and circuit breaking unit according to the present invention have an excellent effect of being able to improve the degree of freedom of the layout of the respective devices while arranging the circuit breaker on the roof of the car. Thus, the present invention is useful when it is widely applied to railcars that can achieve the meaning of the effect.

REFERENCE SIGNS LIST 1 to 6 car
10 railcar
11 power collector
12A to 12C circuit breaking unit
13 circuit breaker
13a main body portion
13b, 13c ten Anal portion
16, 17 branch joint
16a, 17a base portion
16b to 16e, 17b to 17e joint connector portion
18 arrester
18a connecting terminal
20 main transformer
25 first electric power cable
26 second electric power cable
27 third electric power cable
30 roof
36 supporting conductor
37 insulator
41 conductor
42 insulating body
42b to 42d tip end
47 connecting terminal
50, 60, 70 cable connector
51 housing
51a base tubular portion
51b fit tubular portion
51c work tubular portion
51d work opening
52 cap
80 arrester connector

The invention claimed is:

1. A railcar comprising:
a power collector configured to collect electric power through overhead contact lines;
a circuit breaking unit connected to the power collector and arranged on a roof of a car; and
a plurality of electric power cables connected to the circuit breaking unit, wherein
the circuit breaking unit includes:
    a circuit breaker arranged above the roof of the car and connected to a circuit connected to the power collector; and
    a branch joint that is integrally connected to a terminal portion of the circuit breaker and arranged under the circuit breaker, and to which the plurality of electric power cables are connected,
the circuit breaker includes a main body portion configured to open and close the circuit and the terminal portion projecting from the main body portion, and
the terminal portion includes an input-side terminal portion projecting from the main body portion toward one side of the car in a substantially horizontal direction and an output-side terminal portion projecting from the main body portion toward another side of the car in the substantially horizontal direction.

2. The railcar according to claim 1, wherein the terminal portion of the circuit breaker and the branch joint are respectively arranged at positions overlapping with each other in plan view.

3. The railcar according to claim 1, wherein:
the branch joint and a supporting body configured to support the terminal portion of the circuit breaker from below are integrally formed; and
the supporting body includes (i) a supporting conductor extending upward from the branch joint and connected to the terminal portion of the circuit breaker and (ii) an insulator configured to cover the supporting conductor.

4. The railcar according to claim 1, wherein the railcar is configured by coupling a plurality of cars to one another,
the railcar further comprising a transformer mounted under a floor of the car at which the circuit breaker is arranged or inside the car at which the circuit breaker is arranged, wherein:
the plurality of electric power cables include
a first electric power cable extending toward one of the plurality of cars, said one car being adjacently located on one side of the car at which the circuit breaker is arranged,
a second electric power cable extending toward another one of the plurality of cars, said another car being adjacently located on another side of the car at which the circuit breaker is arranged, and
a third electric power cable connected to the transformer;
the branch joint is connected to at least the input-side terminal portion;
the first electric power cable and the second electric power cable are connected to the branch joint connected to the input-side terminal portion; and
the third electric power cable is electrically connected to the output-side terminal portion.

5. The railcar according to claim 1, further comprising cable connectors respectively attached to tip end portions of the plurality of electric power cables and fitted to and connected to the branch joint, wherein
each of fit directions of the cable connectors is substantially perpendicular to a longitudinal direction of the electric power cable.

6. The railcar according to claim 5, wherein:
the branch joint is configured such that a multibranched conductor is embedded in an insulating body;
the branch joint includes a base portion electrically connected to the terminal portion of the circuit breaker and a plurality of joint connector portions that project outward from the base portion in a branching manner;
the conductor is exposed from tip ends of the plurality of joint connector portions;
the cable connectors respectively include housings;
each of the housings includes
a fit tubular portion including a fit opening whose fit direction is a direction substantially perpendicular to the longitudinal direction of the electric power cable and
a base tubular portion that extends continuously from the fit tubular portion in a direction substantially perpendicular to the fit tubular portion and into which the tip end portion of the electric power cable is inserted; and
in a state where the fit tubular portion is fitted to the joint connector portion, the conductor is connected to a connecting terminal provided at the tip end portion of the electric power cable.

7. The railcar according to claim 6, wherein each of the joint connector portions projects in a railcar width direction.

8. The railcar according to claim 7, wherein:
each of the cable connectors includes a work tubular portion that is arranged on a substantially same straight line as the fit tubular portion arranged substantially perpendicular to the base tubular portion and projects in a direction opposite to the fit tubular portion;
the work tubular portion includes a work opening that communicates with a portion where the conductor and the connecting terminal are connected to each other; and
an insulating plug is attached to the work opening.

9. The railcar according to claim 6, further comprising:
an arrester; and
an arrester connector attached to a tip end portion of the arrester and fitted to and connected to the joint connector portion, wherein:
the arrester connector includes a housing; and
in a state where the housing is fitted to the joint connector portion, the conductor is connected to a connecting terminal provided at the tip end portion of the arrester.

10. The railcar according to claim 6, wherein the housings have a same shape as one another.

11. A railcar comprising:
a car including a power collector configured to collect electric power through overhead contact lines and another car not including the power collector, the car and said another car being coupled to each other, wherein:
the car includes first and second circuit breaking units connected to the power collector and arranged on a roof of the car and a transformer mounted under a floor of the car or inside the car;
each of the first and second circuit breaking units includes
a circuit breaker arranged above the roof and connected to a circuit connected to the power collector, and
a branch joint which is integrally connected to a terminal portion of the circuit breaker and arranged under the circuit breaker;
an electric power cable connected to the branch joint of the first circuit breaking unit is connected to the transformer of the car; and
an electric power cable connected to the branch joint of the second circuit breaking unit extends toward said another car.

12. A circuit breaking unit connected to a power collector of a plural-car train in which a plurality of cars are coupled to one another and arranged on a roof of at least one of the plurality of cars,
the circuit breaking unit comprising:
a circuit breaker configured to break a circuit when a predetermined current or a current higher than the predetermined current flows through the circuit breaker, the circuit breaker including a main body portion configured to open and close the circuit and a terminal portion projecting from the main body portion; and
a branch joint integrally connected to the terminal portion of the circuit breaker and arranged under the circuit breaker, the terminal portion including an input-side terminal portion projecting from the main body portion toward one side of said one of the plurality of cars in a substantially horizontal direction and an output-side terminal portion projecting form the main body portion towards another side of said one of the plurality of cars in the substantially horizontal direction.

* * * * *